Patented Feb. 20, 1934

1,947,486

UNITED STATES PATENT OFFICE

1,947,486

LAMINATED GLASS AND METHOD OF MAKING THE SAME

William Henry Moss, London, England, assignor to Celanese Corporation of America, a corporation of Delaware No Drawing. Application March 25, 1931
Serial No. 525,317

6 Claims. (Cl. 49—81)

This invention relates to the production of laminated glass.

An object of the invention is to prepare laminated glass by the interposition between sheets of glass of plastic materials containing derivatives of cellulose such as cellulose acetate which plastic materials contain such amounts of water that they are readily flowable under pressure.

I have found that if water is added in a limited quantity to a plastic composition containing a derivative of cellulose, the plasticity of the composition is materially increased, so that the same may be worked into desired form and caused to flow between sheets of glass in such a manner as to conform itself with any unevenness of the glass with the application of lower pressure than has heretofore been required.

In accordance with my invention, I treat a plastic containing a derivative of cellulose in such a manner as to leave within the plastic a limited amount of water, say from 1 to 6% of the weight of the plastic, and thereafter interpose sheets of the plastic between sheets of glass and subject the whole to pressure.

The derivative of cellulose employed in the plastic which is interposed between sheets of glass may be any suitable derivative such as cellulose nitrate and particularly organic derivatives of cellulose such as organic esters of cellulose and cellulose ethers. Examples of organic esters of cellulose are cellulose acetate, cellulose formate, cellulose propionate and celluose butyrate: while examples of cellulose ethers are ethyl cellulose, methyl cellulose and benzyl cellulose.

The plastic may contain plastifiers or softening agents such as triacetin or diphenyl propane. It may also contain residual solvents used in the manufacture of the same. The composition may be treated with water whilst in the form of powder, sheets, blocks or irregularly shaped articles.

Laminated glass has wide use in automobiles and other moving vehicles because of its shatterless properties. This laminated glass consists of one or more layers of celluloid-like sheets interposed between two or more sheets of glass, the glass and celluloid-like sheets being held together by an adhesive in the preparation of such laminated glass. The glass and the celulloid-like sheets are pressed together after the surfaces of either or both have been coated with an adhesive. In many processes, this pressing of the glass and the celluloid-like sheet is done in some type of hydraulic press at elevated temperature and under pressure of several hundred pounds. The temperature and pressure employed is generally such as to render the celluloid-like sheets and the adhesive so plastic that they begin to flow, since in order to obtain best results it is necessary that the plastic or celluloid-like sheets should conform itself to any unevenness of the glass, in order to obtain equal adhesion of the plastic to the glass at all points. If substantially lower pressure and temperatures are used than are required to obtain the desired plasticity, the adhesion of the glass to the celluloid-like sheet will be poor and the laminated glass will not have the desired non-shatterable properties.

From an economical and technical point of view, the use of high pressures and temperatures is undesirable because of the great difficulty and cost of obtaining them. Moreover, the higher the pressure the greater is the danger of breakage of the glass. By the use of my invention the pressure required for making laminated glass is greatly reduced. I have found that the presence of a small percentage of water in plastic films containing cellulose acetate modifies its stress-strain characteristics. Thus a plastic sheet containing cellulose acetate and 1 to 2% of water is much more plastic than a completely dry one as is indicated by the fact that if specimens of equal size and shape are tested on a tensile strength-elongation machine under given loading conditions, a wet specimen will show more elongation than a dry one. Moreover, if wet and dry celluloid-like sheets are pressed between glass plates at the same temperatures, a wet sheet will begin to flow out from the sides of the glass plate at a much lower pressure than will the dry sheets. I have found that when a cellulose acetate plastic sheet contains 4 to 5% of moisture, the pressure necessary to laminate a sheet of the plastic between glass is reduced from 200 lbs. per square inch for the dry specimen to 100 lbs. per square inch for the wet specimen.

The addition of the water to the plastic to be interposed between sheets of glass in performing my invention is most conveniently done by soaking sheets of the plastic containing the organic derivative of cellulose, such as cellulose acetate, in water until the desired amount of water is absorbed. The amount of water absorbed should be sufficiently large so that the sheets contain 1 to 5% of their weight of water just prior to its insertion between the glass plates. In determining the amount of water the sheets are permitted to absorb, due consideration should be given to any evaporation of the water that may take place.

The bath in which the sheets are soaked may, if desired, contain besides the water, other substances, for example organic liquids such as ethyl alcohol, ethyl lactate or other solvents or partial solvents for the derivative of cellulose, and also softeners or plastifier such as triacetin or diphenylol propane. I have also found that if the aqueous bath contains inorganic salts which are partly absorbed by the plastic sheet at the same time, desirable effects are produced.

If the commonly used gelatin or glue is employed as the adhesive for making the laminated glass, the water retained by the plastic sheet also assists in producing further adhesion between the glass and the plastic sheet.

Instead of incorporating the water by soaking the formed sheets in water, the water may be added to the plastic at any state of the manufacture of the same. Thus in the preparation of a plastic from cellulose acetate and softening agent, the water may be added to the softening agent or to any of the volatile solvents employed. This water aids the incorporation of the cellulose acetate in the mass. Or else the water may be added to the cellulose acetate itself. In all of these cases the presence of water materially reduces the viscosity of the plastic mass.

It is to be understood that the foregoing detailed description is given merely by way of illustration and that many variations may be made therein without departing from the spirit of this invention.

What I claim and desire to secure by Letters Patent is:—

1. Method of making laminated glass comprising incorporating 1 to 5% of water into a plastic containing organic derivatives of cellulose and then pressing sheets of the plastic between sheets of glass.

2. Method of making laminated glass comprising incorporating 1 to 5% of water into a plastic containing cellulose acetate and then pressing sheets of the plastic between sheets of glass.

3. Method of making laminated glass comprising soaking sheets of a plastic containing organic derivatives of cellulose in water for a sufficient period of time so that an appreciable amount of water is absorbed and pressing the said sheets whilst they contain from 1 to 5% of water between sheets of glass.

4. Method of making laminated glass comprising soaking sheets of a plastic containing cellulose acetate in water for a sufficient period of time so that an appreciable amount of water is absorbed and pressing the said sheets whilst they contain from 1 to 5% of water between sheets of glass.

5. Laminated glass comprising a sheet of a plastic containing organic derivatives of cellulose and 1 to 5% of water between plates of glass.

6. Laminated glass comprising a sheet of a plastic containing cellulose acetate and 1 to 5% of water between plates of glass.

WILLIAM HENRY MOSS.